US007597293B2

(12) United States Patent
Houghtaling

(10) Patent No.: US 7,597,293 B2
(45) Date of Patent: Oct. 6, 2009

(54) UNITARY HANGING DEVICE

(76) Inventor: Michael Paul Houghtaling, 2315 S. Point Rd., Effingham, SC (US) 29541

( * ) Notice: Subject to any disclaimer, the term of this patent is extended or adjusted under 35 U.S.C. 154(b) by 0 days.

(21) Appl. No.: 12/006,360

(22) Filed: Jan. 3, 2008

(65) Prior Publication Data

US 2009/0173850 A1 Jul. 9, 2009

(51) Int. Cl.
*F16M 11/00* (2006.01)

(52) U.S. Cl. ........................................ 248/175

(58) Field of Classification Search ................. 248/175, 248/153, 154, 302; 47/66.6, 67
See application file for complete search history.

(56) References Cited

U.S. PATENT DOCUMENTS

| | | | | | |
|---|---|---|---|---|---|
| 1,810,855 | A | * | 6/1931 | Rockmore | 220/487 |
| 2,190,065 | A | * | 2/1940 | Griffin | 211/85.26 |
| 2,216,876 | A | * | 10/1940 | Crum | 248/74.2 |
| 2,235,986 | A | * | 3/1941 | Ellingson | 248/153 |
| D275,432 | S | | 9/1984 | Chan et al. | |
| D277,247 | S | | 1/1985 | Chan et al. | |
| 4,524,542 | A | * | 6/1985 | Elliott | 47/67 |
| 4,908,982 | A | | 3/1990 | Quatrini | |
| 5,868,369 | A | | 2/1999 | Montgomery | |
| D415,366 | S | | 10/1999 | Walters-Dowding et al. | |
| 6,273,376 | B1 | | 8/2001 | Montgomery | |
| 6,588,723 | B1 | * | 7/2003 | Moran, III | 248/530 |
| 2003/0164433 | A1 | | 9/2003 | Junger | |
| 2006/0016943 | A1 | * | 1/2006 | Thompson | 248/175 |
| 2007/0145208 | A1 | * | 6/2007 | Beaver | 248/175 |

FOREIGN PATENT DOCUMENTS

| | | | |
|---|---|---|---|
| CA | CN 201033959 | * | 3/2008 |
| FR | 2570591 | * | 3/1986 |

* cited by examiner

*Primary Examiner*—Ramon O Ramirez
(74) *Attorney, Agent, or Firm*—J. Bennett Mullinax, LLC

(57) ABSTRACT

An apparatus for use in hanging objects is provided. The apparatus has a base, a vertically extending portion that is supported by the base, and a hook that is supported by the vertically extending portion. The base, the vertically extending portion, and the hook are formed from a single component so that the vertically extending portion is integrally formed with the base and the hook.

19 Claims, 6 Drawing Sheets

UNITARY HANGING DEVICE

FIELD OF THE INVENTION

The present invention relates generally to devices for hanging objects. More particularly, the present application involves a unitary hanging device capable of hanging objects such as plants, flags, bird houses or bird feeders.

BACKGROUND

Household items such as plant feeders, bird houses, baskets and flags are commonly suspended from a structure located on the property of the owner. For example, a bird house may be attached to a chain that is subsequently looped over the limb of a tree located in the front or back yard of the property owner. Suspension of the bird house in this manner results in placement at a desired, functional location. In addition, this type of suspension likewise results in an aesthetically pleasing appearance.

Other objects such as plants are likewise suspended from structures located on the property of the owner. Here, a basket holding the plant may have a chain or rope attached thereto that is subsequently secured to a hook mounted onto the ceiling of a porch or interior room of the homeowner. The plant can thus be suspended in a visually pleasing manner while allowing use of the floor space located under the plant.

Flags are also common items found in the possession of property owners. In this regard, a mounting bracket can be secured through use of mechanical fasteners to a side of a structure located on the property. Typical placement locations include next to the front door or a window of the house. Alternatively, the mounting bracket may be secured onto the side of a barn or garage also located on the property. A flag attached to an elongated rod can be slipped into the mounting bracket and secured thereon in order to suspend the flag in a visually pleasing orientation.

Although it is known to suspend objects from structures located on the property of a homeowner, sufficient options presented to the homeowner are not available for holding objects in certain desired manners. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
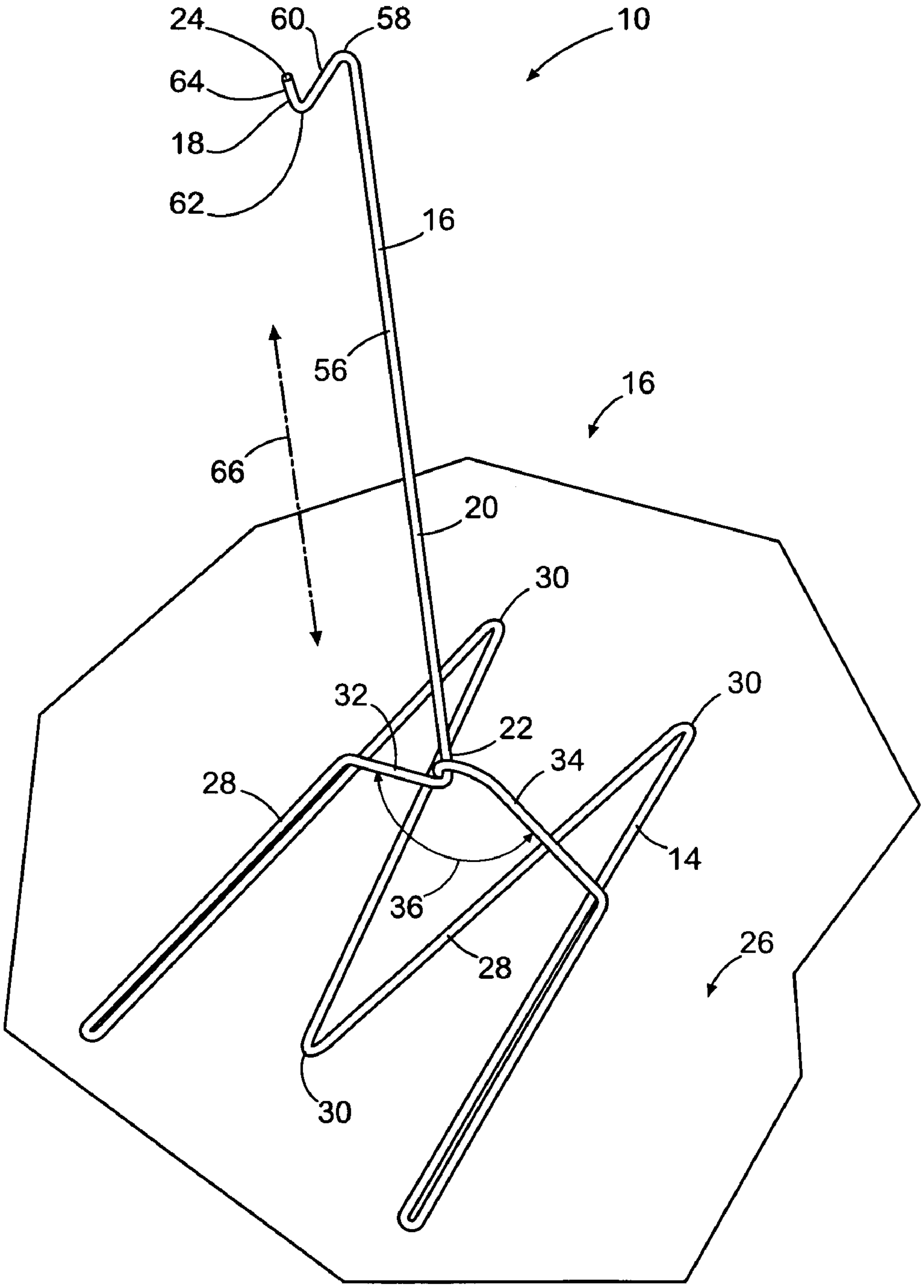
FIG. 1 is a perspective view of a hanging device in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a hanging device 10 useful in supporting objects 12 commonly owned by homeowners such as plants, flags, bird houses, candles, feeders and the like. The hanging device 10 may include a component 20 that is a single integral piece that forms a base 14, a vertically extending portion 16, and a hook 18. The component 20 may be made from round steel stock and can be shaped so as to include a number of straight sections 28 and a number of turns 30. The object 12 can be supported by the hook 18 so that it is suspended in an attractive, functional manner.

Figure 2:
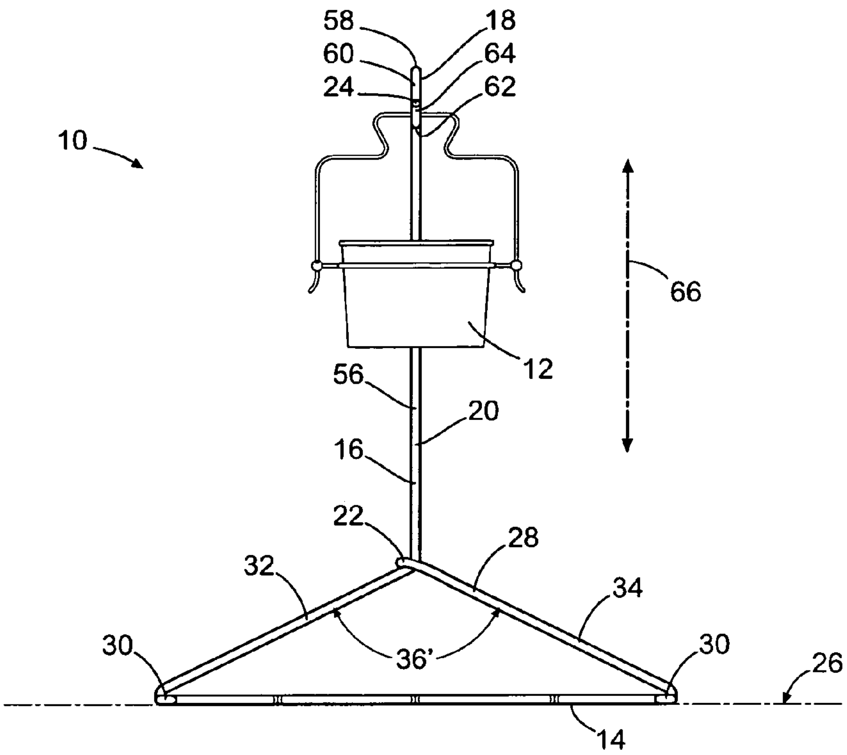
FIG. 2 is a front view of the hanging device of FIG. 1.
Figure 3:
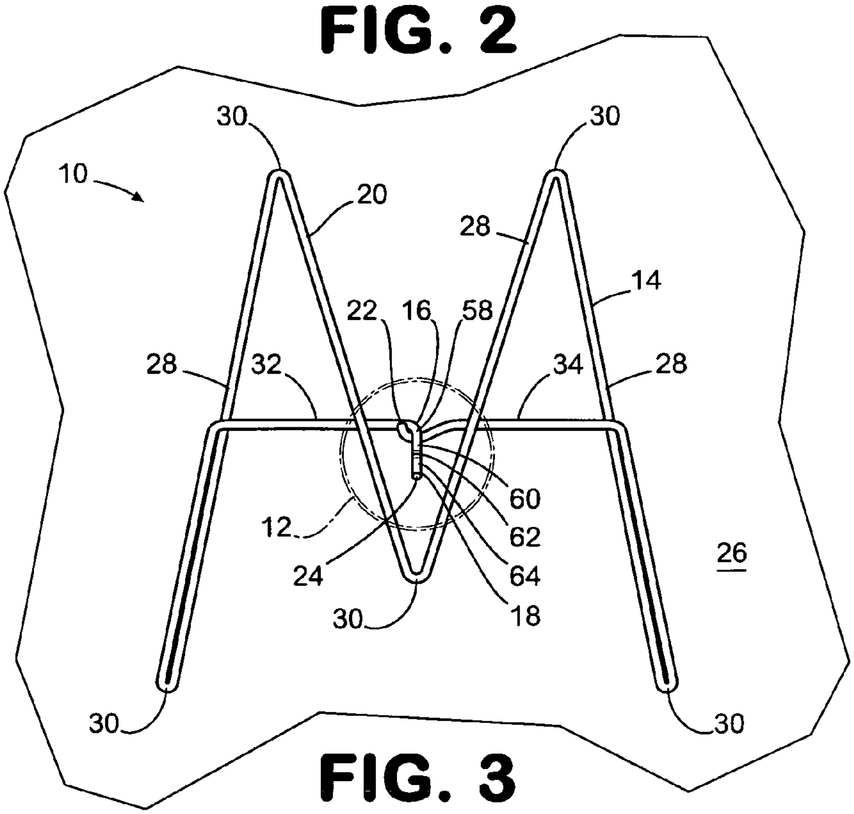
FIG. 3 is a top view of the hanging device of FIG. 1.

One exemplary embodiment of the hanging device 10 is shown in FIGS. 1-3. As shown, the component 20 is a single, integral piece that is formed with a number of straight sections 28 and turns 30. In accordance with one exemplary embodiment, the component 20 is three quarter inch diameter round steel stock that is turned so as to have the straight sections 28 and turns 30 illustrated. However, it is to be understood that the component 20 can be made of various materials, having various shapes and sizes in accordance with other exemplary embodiments. For example, the component 20 can be round and may have a diameter from one quarter inch to two inches in size. Component 20 may have a length of sixteen feet in accordance with one embodiment, but other lengths are envisioned in other embodiments. For example, the component 20 may have a length from ten to forty feet in accordance with certain exemplary embodiments. The component 20 can have various diameters. For example, the component 20 may have diameters from one quarter inch to three inches in accordance with different exemplary embodiments. The component 20 may have a cross-sectional shape that is square, tubular, triangular, rectangular, or star shaped in accordance with certain exemplary embodiments. Further, although described as being made of steel, component 20 can be made of brass, iron, aluminum, or plastic in accordance with various exemplary embodiments.

The component 20 is shaped so as to form a base 14 that is capable of supporting portions of the hanging device 10 located vertically above the base 14. As shown, the base 14 is made from a number of straight sections 28 and turns 30 that provide a footprint that has both a wide width and depth. Several of the straight sections 28 and turns 30 in the base 14 lie in a horizontal plane so that the base 14 is capable of laying on a flat surface 26 such as the ground, a sidewalk, a porch, or a floor on the interior of a house. As shown, three turns 30 are located on the front side of the base 14 and two turns 30 are located on the back, opposite side of the base 14. Further, six straight sections 28 are included in the portion of the base 14 that is arranged in the horizontal plane and is capable of contacting the surface 26. However, it is to be understood that any number of straight sections 28 and turns 30 can be included in the base 14 in accordance with other exemplary embodiments. For example, a total of from two to fifty straight sections 28 and turns 30 can be present in the base 14 in other arrangements.

The base 14 also includes a pair of straight sections 32 and 34 that extend in the vertical direction 66. The pair of straight sections 32 and 34 do not lie in the horizontal plane that includes straight sections 28 and turns 30 that contact the surface 26. The pair of straight sections 32 and 34 can extend from turns 30 located at the outermost straight sections 32 with respect to the width of the base 14. The pair of straight sections 32 and 34 extend in the vertical direction 66 upwards from the surface 26 from the other portions of the base 14. Additionally, the straight sections 32 and 34 approach one another as they extend vertically upwards towards other sections of the hanging device 10 such as the vertically extending portion 16 and the hook 18. The straight sections 32 and 34 are oriented at an angle 36 with respect to one another that faces the surface 26 onto which the hanging device 10 rests. Angle 36 may be of various degrees in accordance with certain exemplary embodiments. For example, angle 36 can be an obtuse angle and may be from 110° to 160° in accordance with various exemplary embodiments. In accordance with other embodiments, the angle 36 can be a right angle. In still further exemplary embodiments, angle 36 is an acute angle that can be from 30° to 80°. As such, it is to be understood that the angle 36 can be variously dimensioned in accordance with other arrangements of the hanging basket 10.

The straight sections 32 and 34 are arranged so as to provide structural support to portions of the hanging device 10 located vertically above the base 14. However, it is to be understood that other arrangements of the hanging device 10 are possible in which vertically extending sections 32 and 34 are not present and used for supporting portions of the hanging device 10 located vertically above the base 14. Further, although shown as being straight sections 32 and 34, these sections may include turns 30 or a number of straight sections 28 in accordance with other exemplary embodiments.

The component 20 has a first end 22 and an oppositely located second end 24. The first end 22 is located at the straight section 34 and is attached to the straight section 32. The first end 22 can be attached to the straight section 32 in a variety of manners. For example, the first end 22 can be attached through the use of welding, brazing, clinching, mechanical fasteners, or adhesion to the straight section 32. Alternatively, the first end 22 can be turned around the straight section 32 in order to realize a sufficient attachment. Attachment of the first end 22 acts to tie the various sections of the base 14 together so as to result in a stronger base 14 and hanging device 10. However, it is to be understood that other arrangements are possible in which the first end 22 is not attached to the base 14, vertically extending portion 16 or other part of the component 20 or hanging device 10.

The component 20 includes a vertically extending portion 16 that is supported by the base 14 and extends therefrom. The vertically extending portion 16 is made of a single straight section 56. However, it is to be understood that the vertically extending portion 16 may be made from any number of straight sections 28 and turns 30 in accordance with other exemplary embodiments. For example, the vertically extending portion 16 can include from one to seven straight sections 28 and from one to seven turns 30 in other versions of the hanging device 10. The vertically extending portion 16 as shown in FIGS. 1-3 extends in a direction perpendicular to the surface 26 onto which the base 14 rests. However, other versions are possible in which one or more sections of the vertically extending portion 16 extends at an angle to the surface 26 and are not perpendicular therewith. The vertically extending portion 16 functions to provide height to the hanging device 10 so that the object 12 is suspended at a sufficient location above the surface 26. The vertically extending portion 16 may extend a length of two feet in certain embodiments. In accordance with other exemplary embodiments, the vertically extending portion 16 may extend from one to ten feet.

The component 20 includes a hook 18 located at the upper end of the vertically extending portion 16. The object 12, which in FIG. 2 is shown as a potted plant, can be retained on the hook 18 and thus supported and suspended by the hanging device 10. The base 14, vertically extending portion 16 and hook 18 are thus integrally connected to one another and are all made of the single, integral component 20. However, it is to be understood that other arrangements of the hanging device 10 are possible in which these three components are either not all present, or are not all made from a single, integral component 20. The hook 18 has a first hook turn 58 that is located at the upper end of the vertically extending portion 16. A first straight section 60 of the hook 18 extends from the first hook turn 58 in a downward direction in the vertical direction 66. A second hook turn 62 is located in the hook 18 at an end of the first straight section 60 opposite the end featuring the first hook turn 58. A second straight section 64 extends from the second hook turn 62 in an upwards direction in the vertical direction 66. As such, the first and second straight sections 60 and 64 are arranged with respect to one another so that they extend towards one another in the downward vertical direction and so that they extend away from one another in the upwards vertical direction of the hanging device 10. The second end 24 of the component 20 is located at the end of the second straight section 64 of the hook 18. The hook 18 thus assumes a shape capable of holding various objects 18 commonly found in a residence or business or on private or public property.

Figure 5:
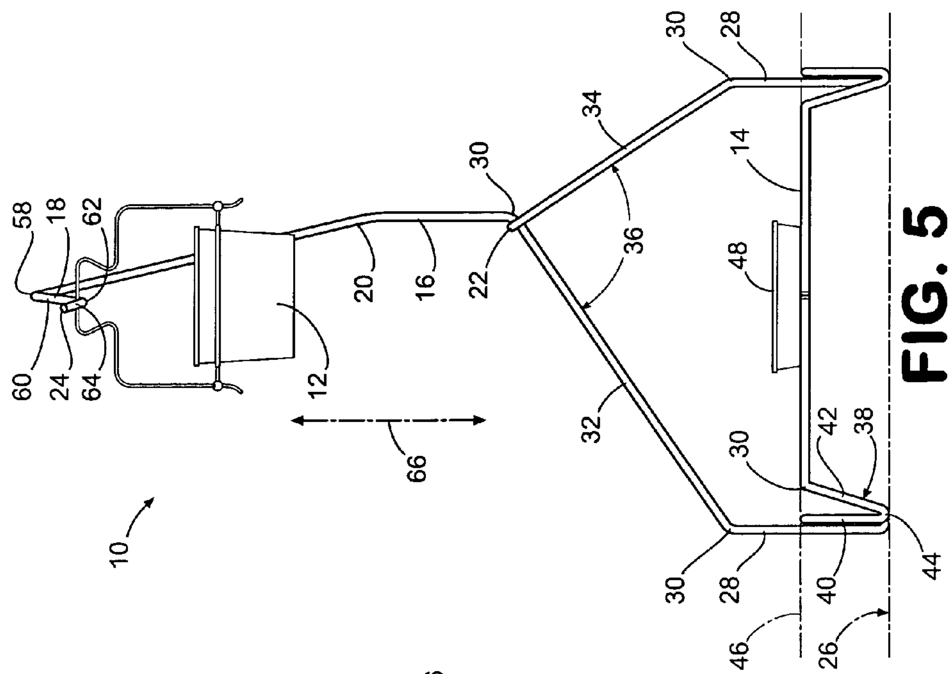
FIG. 5 is a front view of the hanging device of FIG. 4.
Figure 4:
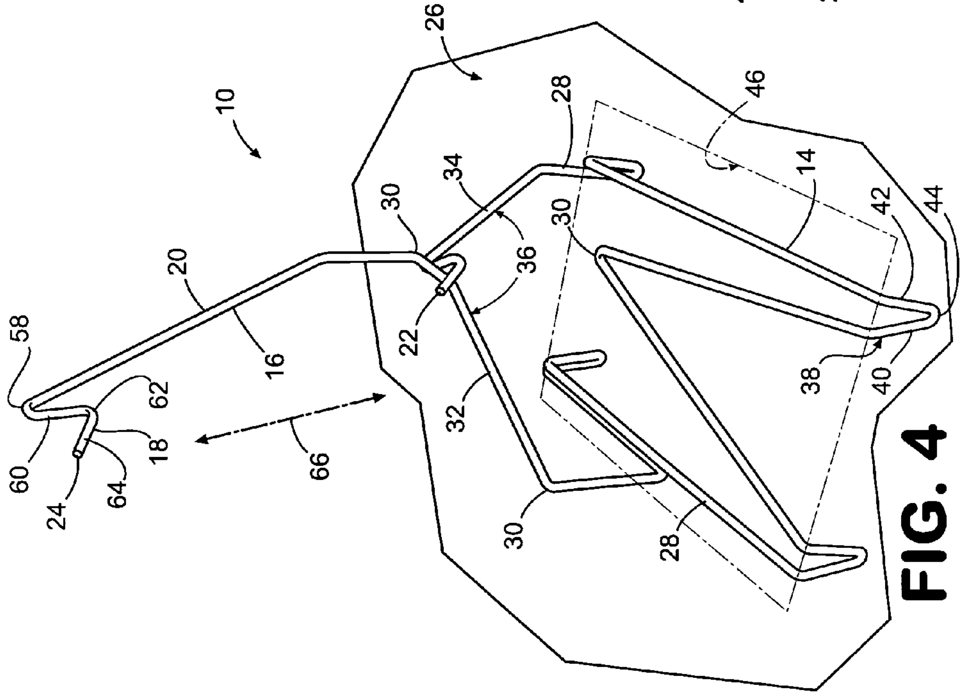
FIG. 4 is a perspective view of a hanging device in accordance with another exemplary embodiment.

The hanging device 10 can be variously configured in accordance with other exemplary embodiments. FIGS. 4 and 5 show another exemplary embodiment of the hanging device 10. As with the embodiment described in FIGS. 1-3, the hanging device 10 has a component 20 that is a single, integral piece that makes up the base 14, vertically extending portion 16, and hook 18. The embodiment in FIGS. 4 and 5 includes a base 14 that has four legs 38. The legs 38 are each made of a straight section 40 and a straight section 42 that have a turn 44 disposed therebetween. Two of the legs 38 are located at the left side of the base 14, and two of the legs 38 are located at the right side of base 14. Further, two of the legs 38 are located at the front of the base 14 while the other two of the legs 38 are located at the back of the base 14. The legs 38 are portions of the component 20 and are thus integrally formed with the rest of the base 14 in addition to the vertically extending portion 16 and the hook 18 in the exemplary embodiment of FIGS. 4 and 5. The straight sections 40 and 42 extend generally in the vertical direction 66. The straight sections 40 and 42 may be perpendicular to the surface 26 onto which the hanging device 10 rests or may be oriented at an angle to the surface 26. The legs 38 may all have the same length so that they extend an equal distance vertically in the vertical direction 66. The legs 38 can be pushed or driven by a user into the ground. In this regard, the legs 38 function somewhat like stakes upon being driven into the ground so that they firmly anchor the remaining portions of the hanging device 10 to the ground so that the device 10 does not easily tip over due to wind or other forces. Should the legs 38 be driven into the ground, the other portions of the base 14 may or may not contact the ground. Alternatively, the legs 38 are arranged so that they may rest onto a surface 26, such as a hardwood floor in the home of a user, to support the hanging device 10. In this regard, the turns 44 contact the surface 26. Coasters or other objects may be placed under the legs 38 so that the floor is not damaged when locating the hanging device 10 inside the home of a user.

The base 14 includes various straight sections 28 and turns 30 that are arranged in a horizontal plane 46 that is parallel to the surface 26 onto which the base 14 may rest. The straight sections 28 and turns 30 in the horizontal plane 46 form a rest onto which a drip pan 48 may be supported. Should the hanging device 10 be used to support an object 12 such as a plant, the drip pan 48 can be employed in order to catch water inadvertently spilled from the plant during watering.

The hanging device 10 in FIGS. 4 and 5 includes a pair of straight sections 32 and 34 that extend vertically upwards towards the vertically extending portion 16 and the hook 18. The straight sections 32 and 34 approach one another as they extend vertically upwards in the vertical direction 66. The straight section 32 extends from a turn 30 that is located at an end of a vertically extending straight section 28 located approximately midway along the depth of the base 14. Straight section 34 extends from a turn 30 located at an end of a vertically extending straight section 32 located at the back of the base 14. A series of straight sections 28 and turns 30 extend from the straight section 34. The first end 22 of the component 20 is located at a straight section 28 that is welded to a turn 30 located at the upper end of the straight section 32.

The vertically extending portion 16 has a series of straight sections 28 and turns 30. As shown, the vertically extending portion 16 extends generally in the vertical direction 66 but is not perpendicular to the surface 26 onto which the hanging device 10 rests. The vertically extending portion 16 is arranged so that it supports the hook 18 at a location generally at the center of the footprint of the base 14. The hook 18 is arranged in a manner similar to that as previously discussed with respect to the exemplary embodiment described with reference to FIGS. 1-3. As previously discussed, the hook 18 can be used to retain objects 12 thereon.

Figure 6:
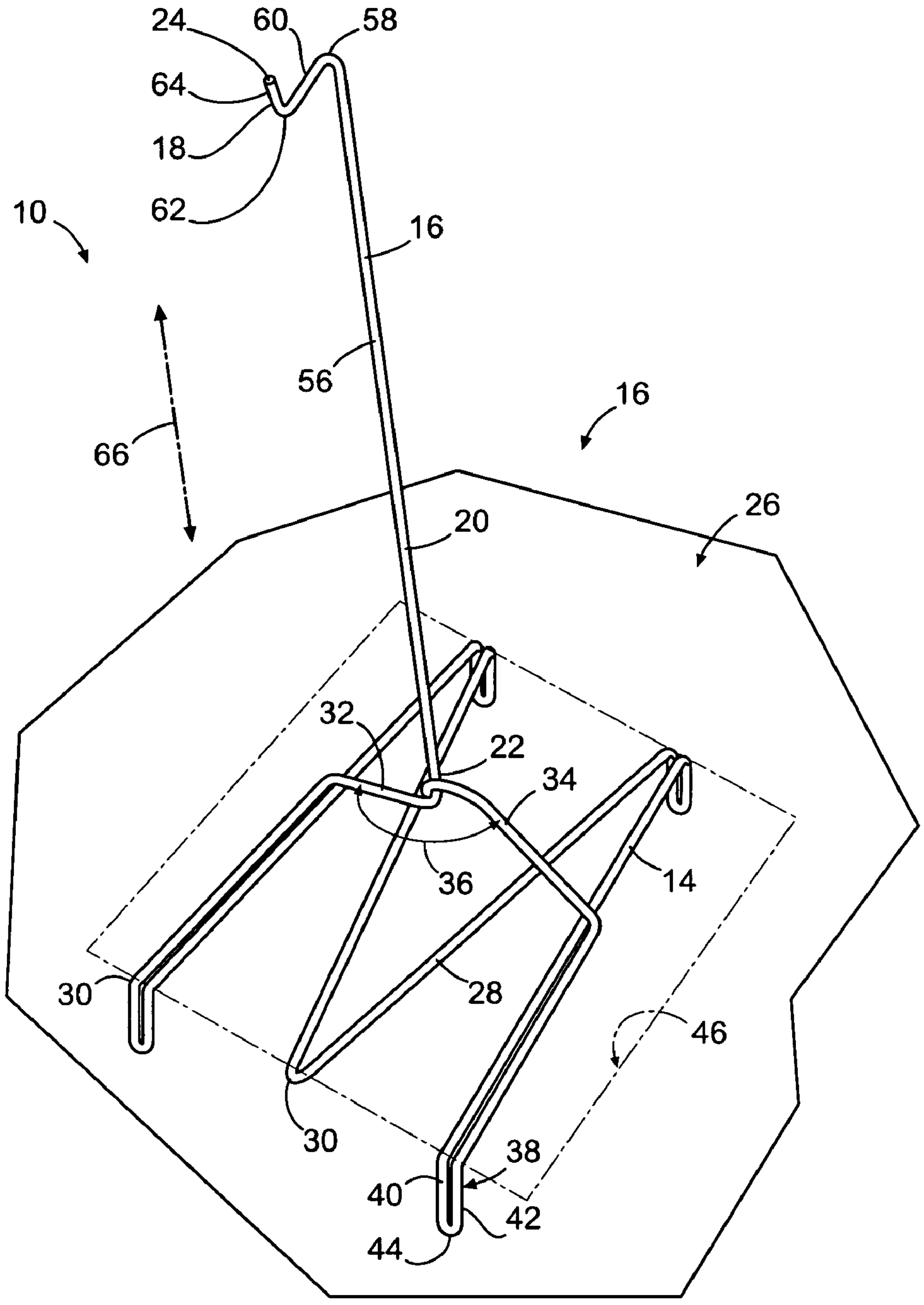
FIG. 6 is a perspective view of a hanging device in accordance with a different exemplary embodiment.

Additional arrangements of the hanging device 10 are possible. FIG. 6 shows another additional variation of the hanging device 10. Here, the hanging device 10 is constructed in a manner similar to that previously discussed with respect to the exemplary embodiment illustrated in FIGS. 1-3. However, four legs 38 are included in the base 14. The legs 38 can be fashioned in a manner such as those previously described with respect to the embodiment in FIGS. 4 and 5. As such, the legs 38 may have straight sections 40 and 42 with intermittent turns 44 that can be driven into the ground in order to more securely retain the hanging device 10 to thus prevent it from tipping over or moving from a desired location. The legs 38 can again be part of the component 20 and may be integrally formed with the base 14 and other portions of the hanging device 10.

Figure 7:
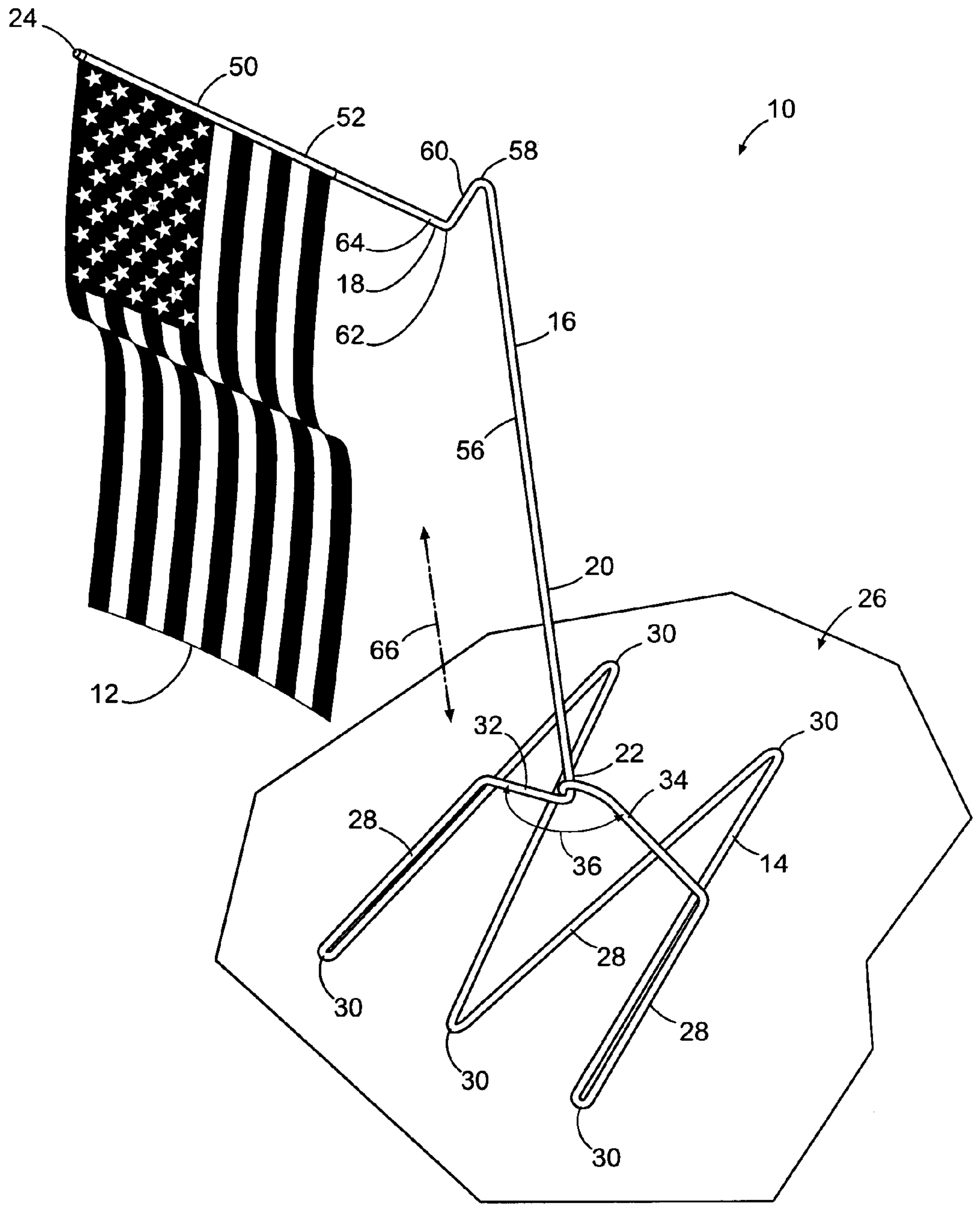
FIG. 7 is a perspective view of a hanging device in accordance with yet another exemplary embodiment.

Another exemplary embodiment of the hanging device 10 is shown in FIG. 7. As an initial matter, the version illustrated in FIG. 7 is basically arranged in a manner similar to that shown in FIGS. 4 and 5 and a repeat of the various features is not necessary. However, the hanging device of FIG. 7 is specifically constructed so as to hang an object 12 that is a flag. The component 20 has a flag supporting member 50 that extends from the hook 18. The flag supporting member 50 is a part of the component 20 and is integrally formed with the base 14, vertically extending portion 16 and hook 18. The flag supporting member 50 is made from a single elongated straight section 52. However, other embodiments are possible in which the flag supporting member 50 is made form any number of straight sections 28 and turns 30. For example, the flag supporting member 50 can be made from one to ten straight sections 28 and can be made from one to ten turns 30 in other embodiments. A flag can be attached to the flag supporting member 50 so as to be supported by the hanging device 10 in a desirable location and orientation. However, other embodiments are possible in which a flag may be hung from the hanging device 50 even when the flag supporting member 50 is not present.

Figure 8:
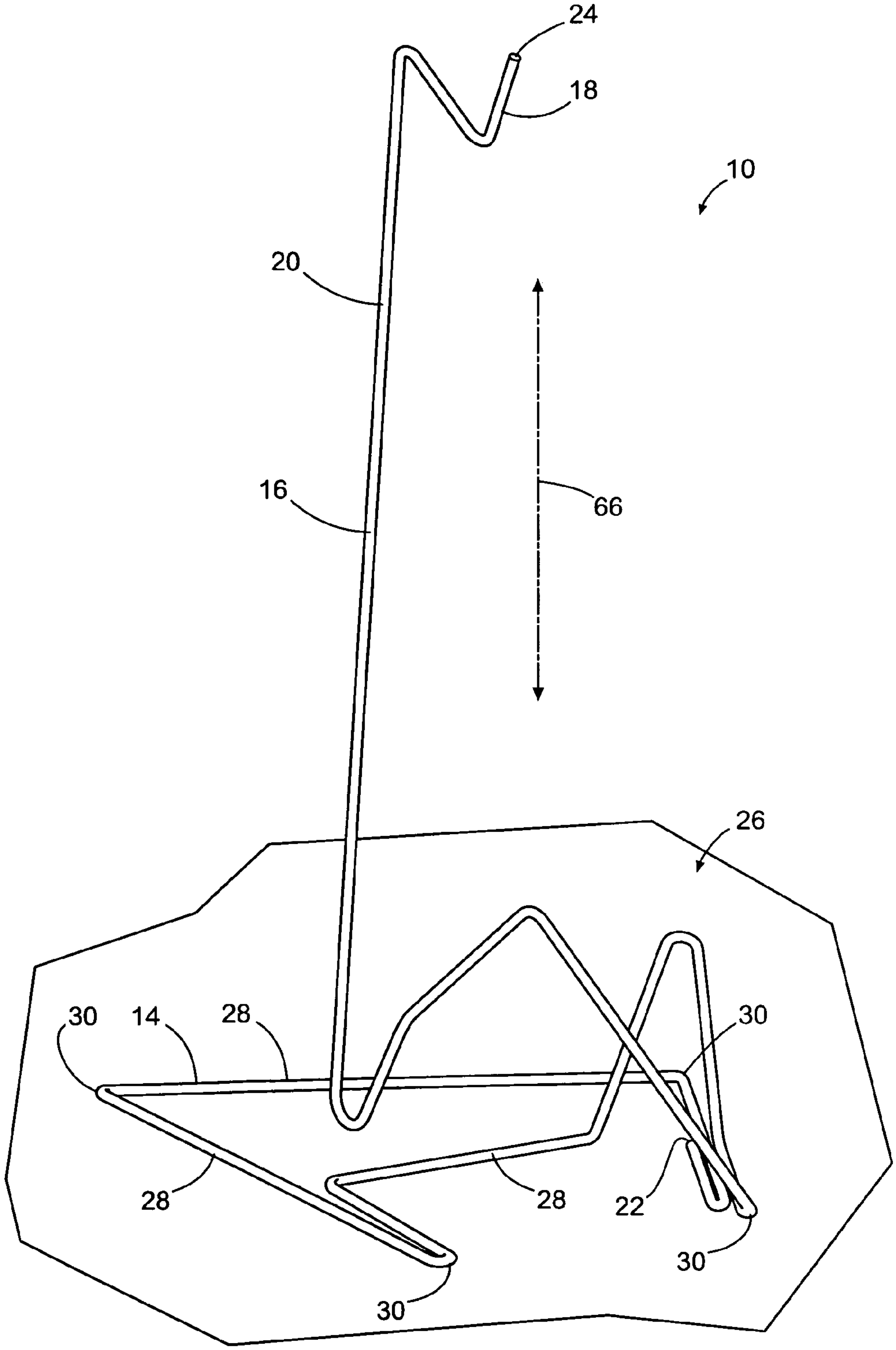
FIG. 8 is a perspective view of a hanging device in accordance with yet another exemplary embodiment.

An additional exemplary embodiment is shown in FIG. 8. Here, a single, integral component makes up the base 14, vertically extending portion 16 and hook 18. The base 14 includes a series of straight sections 28 and turns 30. Several of the straight sections 28 and turns 30 are arranged in a horizontal plane that rests on the surface 26. The base 14 also has a number of straight sections 28 that extend in the vertical direction 66. The base 14 may thus be described as forming a number of complex angles that function to provide weight to the base 14 and prevent it from tipping over or moving from a desired location. The first end 22 of the component 20 is located in the base 14 and is not welded or otherwise attached to another portion of the component 20. The hanging device 10 also includes a vertically extending portion 16 and a hook 18 that are arranged and function in manners similar to those previously described in accordance with other exemplary embodiments.

The previously described embodiments are only exemplary, and it is to be understood that additional versions are also possible. Further, features and description associated with one of the previously mentioned embodiments can be incorporated into other of the described embodiments. The hanging device 10 may thus be a free standing device that can be used indoors or outdoors for use in hanging a variety of objects 18. Although described as being capable of hanging objects 18 such as hummingbird feeders, bug lights, flags, plants, bird houses, baskets, and candles, it is to be understood that various, additional objects 18 may be hung by the hanging device 10 and that the disclosed objects 18 are only exemplary. Further, although shown as hanging a single object 18, other versions are possible in which the hanging device 18 can hang multiple objects 18.

The hanging device 10 may be variously dimensioned. In accordance with one exemplary embodiment, the hanging device 10 has a height of approximately 42 inches, a width of 23 inches, and a depth of 24 inches. However, these are only exemplary dimensions and others are possible. For example, the height may be from 36 inches to 120 inches, the width may be from 12 inches to 60 inches, and the depth may be from 12 inches to 60 inches in accordance with certain exemplary embodiments.

Although described as being made of a single, unitary component 20, it is to be understood that the hanging device 10 may include parts that are not integrally formed with the component 20. For example, cushioning members made of felt or rubber may be attached to the legs 38 in certain exemplary embodiments. Also, other metal parts may be attached to various portions of the hanging device 10. As such, the hanging device 10 is not limited to having only a single, integrally formed component 20. However, other embodiments exist in which the hanging device 10 is made from only a single component 20 without any other parts attached thereto. The hanging device 10 can be painted a variety of colors and may be made light enough so as to be mobile and thus capable of being moved by a user from place to place as desired.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An apparatus for use in hanging objects, comprising:

a base;

a vertically extending portion that is supported by the base; and a hook that is supported by the vertically extending portion, wherein the base, the vertically extending portion, and the hook are formed from a single component such that the vertically extending portion is integrally formed with the base and the hook;

wherein the component in the base has a pair of straight sections that each extend in the vertical direction and approach one another as the pair of straight sections extend towards the vertically extending portion, wherein the pair of straight sections are located proximate to the vertically extending portion.

2. The apparatus as set forth in claim 1, wherein the single component that forms the base, the vertically extending portion, and the hook has a first end and a second end, wherein the first end is welded to a portion of the single component that is located between the first end and the second end along the length of the single component, and wherein the second end is located at the hook.

3. The apparatus as set forth in claim 1, wherein the single component that forms the base, the vertically extending portion, and the hook is made of steel and has a circular cross-section.

4. The apparatus as set forth in claim 1, wherein the vertically extending portion is perpendicular to the ground.

5. The apparatus as set forth in claim 1, wherein the component in the base has a plurality of straight sections, and wherein the component in the base has at least seven turns.

6. The apparatus as set forth in claim 1, wherein the base has four legs that have straight sections that extend in the vertical direction.

7. The apparatus as set forth in claim 1, wherein the base has a plurality of straight sections that are arranged in a horizontal plane and that are capable of holding a drip pan thereon.

8. The apparatus as set forth in claim 1, wherein the hook has a pair of straight sections with a turn disposed therebetween such that the pair of straight sections are oriented at an angle to one another.

9. The apparatus as set forth in claim 1, further comprising a flag supporting member that is supported by the hook, wherein the flag supporting member is formed from the same single component as the base, the vertically extending portion, and the hook such that the flag supporting member is integrally formed with the hook, wherein the flag supporting member has a straight section and is configured for supporting a flag thereon.

10. An apparatus for use in hanging objects, comprising:

a single integral component that has a plurality of straight sections and a plurality of turns, wherein the component forms a base and a vertically extending portion supported by the base, wherein the component forms a hook that is supported by the vertically extending portion, wherein the base is configured for resting on a surface, wherein the base has two straight sections that each extend in the vertical direction and approach one another as the two straight sections extend towards the vertically extending portion, wherein the two straight sections of the base are located proximate to the vertically extending portion.

11. The apparatus as set forth in claim 10, wherein the vertically extending portion has only one straight section of the component.

12. The apparatus as set forth in claim 11, wherein the vertically extending portion is perpendicular to the ground.

13. The apparatus as set forth in claim 10, wherein the component has a first end and a second end, wherein the first end is welded to a portion of the component that is located between the first end and the second end along the length of the component, and wherein the second end is located at the hook, and wherein the component is made of steel and has a circular cross-section.

14. The apparatus as set forth in claim 10, wherein the base has four legs, wherein each one of the legs has a pair of straight sections that extend in the vertical direction, wherein a turn is disposed between each of the pair of straight sections in the legs.

15. The apparatus as set forth in claim 10, wherein the base has a plurality of straight sections that are arranged in a horizontal plane and are capable of holding a drip pan thereon.

16. The apparatus as set forth in claim 10, wherein the hook has a first hook turn that is disposed between the vertically extending portion and a first straight section of the hook, wherein the hook has a second hook turn that is disposed between a second straight section of the hook and the first straight section of the hook, wherein the first and second straight sections of the hook approach one another in a downwards direction in the vertical direction.

17. The apparatus as set forth in claim 10, wherein the component forms a flag supporting member that is supported by the hook, wherein the flag supporting member has a straight section and is configured for supporting a flag thereon.

18. The apparatus as set forth in claim 10, wherein the two straight sections of the base are oriented with respect to one another so as to form an obtuse angle facing the ground.

19. An apparatus for use in hanging objects, comprising:

a single integral component that has a plurality of straight sections and a plurality of turns, wherein the component forms a base that has two straight sections that each extend in the vertical direction and approach one another as the two straight sections extend away from the ground, wherein the component forms a hook that is located vertically above the base, wherein the hook has a first straight section and a hook turn that is disposed between the first straight section of the hook and a second straight section of the hook, wherein the first and second straight sections of the hook approach one another in a downwards direction in the vertical direction, wherein the component has a first end and a second end, wherein the first end is welded to a portion of the component that is located between the first end of the component and the second end of the component along the length of the component, and wherein the second end of the component is located at the hook, and wherein the component has a circular cross-section.

* * * * *